United States Patent [19]

Mori et al.

[11] 4,087,736

[45] May 2, 1978

[54] CURRENT GENERATING SYSTEM

[75] Inventors: Kazumasa Mori, Aichi; Toshio Morishima, Kariya; Katsumi Itoh, Ohbu, all of Japan

[73] Assignee: Nippondenso Co., Ltd., Kariya, Japan

[21] Appl. No.: 707,259

[22] Filed: Jul. 21, 1976

[30] Foreign Application Priority Data

| Jul. 22, 1975 | Japan | 50-89858 |
| Oct. 3, 1975 | Japan | 50-123393 |
| Oct. 3, 1975 | Japan | 50-123394 |
| Oct. 3, 1975 | Japan | 50-123396 |

[51] Int. Cl.² .................. H02J 7/16; H02K 1/00
[52] U.S. Cl. ........................ 322/28; 310/194; 310/263; 320/64; 322/60
[58] Field of Search .............. 310/42, 68 D, 261, 263; 322/28, 60; 320/64, 68; 148/12 A, 19, 122

[56] References Cited

U.S. PATENT DOCUMENTS

| 2,227,156 | 12/1940 | Reardon | 148/122 |
| 2,691,113 | 10/1954 | Ordas | 310/194 X |
| 3,538,362 | 11/1970 | Cheetham et al. | 310/68 D |
| 3,621,360 | 11/1971 | Wiley et al. | 320/64 X |
| 3,891,474 | 6/1975 | Grange | 148/19 X |

Primary Examiner—Robert J. Hickey
Attorney, Agent, or Firm—Cushman, Darby & Cushman

[57] ABSTRACT

A generator comprises an output winding connected to input terminals of a full-wave rectifier and a field winding. A resistor and diodes are also connected to the input terminals for supplying voltage to a voltage regulator. The generator, the rectifier and the voltage regulator are assembled together within a generator housing, so that a single conducting wire is sufficient for connecting the generator and a battery. The pole cores of the generator are made of low carbon steel the residual magnetism of which has been increased by a cementation process or by insertion of high carbon steel elements.

5 Claims, 4 Drawing Figures

CURRENT GENERATING SYSTEM

BACKGROUND OF THE INVENTION

1. Field of the Invention

The present invention relates to a current generating system for a motor vehicle, and more particularly to a generator driven by an engine for supplying a battery of a motor vehicle and other electrical loads. The generator is generally a three-phase alternating current generator equipped with a voltage regulator for controlling the output voltage of the generator.

2. Brief Description of Prior Art

In a typical conventional current generating system of this kind, many conducting wires are used for electrical connections between the generator, the battery charged thereby and the voltage regulator for controlling the output voltage of the generator. Such a system is subject to a wire disconnection, a terminal disengagement, an incorrect connection at connectors etc., whereby the generator stops generating current, the output voltage at the generator may not be controlled and so on.

In another conventional system, which is of the type comprising a generator which establishes an initial field excitation by residual magnetism, a rotor, and especially pole cores therefor, must be made of a material having a high-residual magnetism, for example high carbon steel or the like.

However, since the pole cores for the rotor are generally produced through cold forging of a low-carbon steel in view of productivity, manufacturing cost, etc., it is almost impossible to produce pole cores from the high-carbon steel by such a conventional method. On the other hand, when the pole cores are made of high-carbon steel through other mechanical treatments, such problems as decrease of productivity and a large increase in cost are encountered.

SUMMARY OF THE INVENTION

It is therefore an object of the present invention to provide an improved current generating system to overcome the above disadvantages.

It is another object of the present invention to provide a current generating system which has less conducting wires between a generator, a battery and a voltage regulator.

It is a further object of the present invention to provide a current generating system which has pole cores made of a low-carbon steel, a surface of which is subjected to a cementation treatment to thereby increase the residual magnetism without a large increase in cost.

It is a further object of the present invention to provide a current generating system in which a bobbin for holding a field winding is made of a low-carbon steel, a surface of which is subject to a cementation treatment, to thereby increase the residual magnetism without a large increase in cost.

It is still a further object of the present invention to provide a current generating system which has pole cores made of a low-carbon steel, in which some bars made of a high-carbon steel are inserted, to increase residual magnetism without a large increase in cost.

These and other objects of the present invention will become more apparent by reference to the following detailed description when considered in connection with the accompanying drawings.

DETAILED DESCRIPTION OF THE PREFERRED EMBODIMENTS

Figure 1:
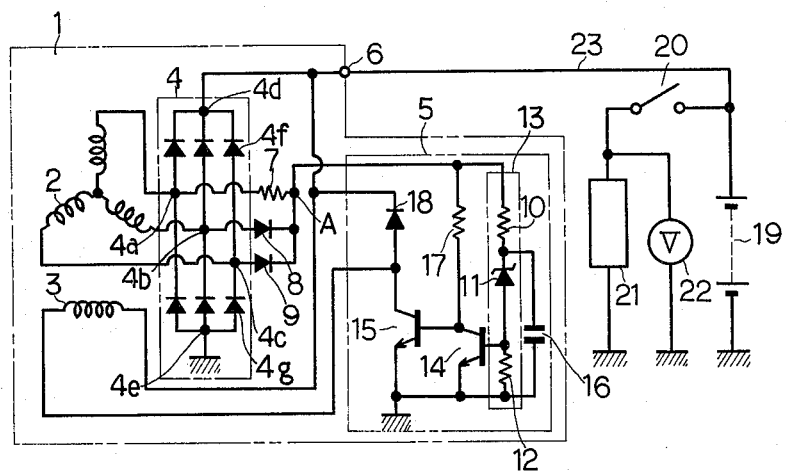
FIG. 1 is an electric wiring diagram of a current generating system according to the present invention.

Referring now to FIG. 1, numeral 1 designates a direct current power source of an alternating current generator equipped with a rectifying device, which is driven by an engine (not shown) on a motor vehicle to supply battery charging current and other electrical loads on the vehicle. The generator 1 includes a three-phase Y-connected output winding 2 which is connected to AC input terminals 4a, 4b and 4c of a three-phase full-wave rectifying network 4. The network 4 comprises three positive diodes 4f constituting a positive terminal 4d at their cathodes and three negative diodes 4g likewise constituting a negative terminal 4e at their anodes. The positive terminal 4d is connected to a single output terminal 6 of the generator 1.

A resistor 7 and diodes 8 and 9 are respectively connected to the AC input terminals of the rectifying network 4 for constituting a signal terminal A producing an output signal (voltage) earlier than the positive terminal 4d because of provision of the resistor 7.

The generator also includes a field winding 3 and a voltage regulator 5 for controlling the field excitation at the field winding 3. The voltage regulator 5 includes a resistor 10, a zener diode 11 and a resistor 12, which are connected in series with each other, forming a voltage responsive circuit 13 connected to the signal terminal A. The regulator 5 also includes a first transistor 14, a second transistor 15, a capacitor 16, a resistor 17 and a diode 18. The base of the first transistor 14 is connected with the voltage responsive circuit 13 so that the conduction and non-conduction of the transistor 14 is controlled by the voltage drop developed across the resistor 12 responding the voltage at the signal terminal A. A capacitor 16 is connected in parallel with the zener diode 11 and the resistor 12 for smoothing the output voltage at the terminal A. The collector of the transistor 14 is connected to the terminal A through the resistor 17 and the emitter thereof is grounded. The base of the transistor 15 is connected to the collector of the transistor 14 and collector-emitter path thereof is connected across the positive and negative terminals 4d and 4e of the rectifier network 4 through the field winding 3 forming a field energizing circuit, so that the field excitation is controlled by the transistor 15. The diode 18 is connected across the field winding 3 for absorbing the back electromotive force produced thereat when the field current is cut off.

The voltage regulator 5 is assembled within a housing of the generator 1 so that the single output terminal 6 is sufficient for charging a battery 19 through a cable 23.

An electrical load 21 such as a headlamp, radio or the like, and a voltmeter 22 connected in parallel therewith, are connected to the battery 19 through a key switch 20.

In operation, when the key switch 20 is closed so as to start an engine (not shown), the generator 1 begins to be rotated causing the output winding 2 to generate a small voltage due to residual magnetism of the generator 1, produced by pole cores of a rotor for carrying the field winding 3, irrespective of the fact that no field excitation is established at the field winding 3 since the transistor 15 remains turned-off at the starting of the engine.

The small voltage at that time is converted into direct current by the combination of the negative diodes 4g of the rectifier network 4, resistor 7 and diodes 8 and 9, which is applied to the base of the transistor 15 as well as the voltage responsive circuit 13.

As the circuit 13 detects the voltage at the terminal A at that time, which is insufficient to drive the first transistor 14 into conduction, the second transistor 15 is driven into conduction to establish an initial field excitation. The amount of current flowing through the field winding 3 is relatively small at the initial field excitation, because the output voltage at the terminal A caused by the residual magnetism is small. However, the generator 1 soon generates a sufficient output voltage, because of the initial field excitation, so as to drive the second transistor 15 into a full conduction, resulting in a completion of the field excitation.

The output at the generator 1 then charges the battery 19 through the cable 23 and at the same time the voltage at the signal terminal A is applied to the voltage responsive circuit 13 including the capacitor 16. When the voltage across the capacitor 16 exceeds a predetermined value, the circuit 13 drives the first transistor 14 into conduction and thereby drives the second transistor 15 into nonconduction. Thus the supply of the field current for the field winding 3 is stopped to decrease the output voltage at the generator 1.

On the other hand, when the voltage across the capacitor 16 falls below the predetermined value, the first transistor 14 is restored to its initial state of nonconduction, and likewise the second transistor 15 becomes conductive to again establish the field excitation, thus increasing the output voltage at the generator 1.

Repeating the above operation, the battery voltage is consequently controlled at a desired value.

The generator described above can generate the output voltage at a earlier stage of the rotational operation of the generator when compared with such a generator having a diode in place of the resistor 7 and the same construction for the remaining parts, since the combination of the resistor 7 and the diodes 8 and 9 can effectively apply even a small voltage (for example 2~3 volts) at the generator 1 to the base of the second transistor 15.

More in detail, the base current for the second transistor 15 is determined by the respective resistance values of the resistors 7 and 17 and the voltage drop (around 0.6 volt) across the base and the emitter of the second transistor 15. When the resistor 7 is replaced by a diode, the base current for the second transistor 15 is further limited by the voltage drop of 0.8 volt across the diode, resulting in the decrease of the voltage applied to the base of the second transistor. In other words, with the diode in place of the resistor 7, the second transistor 15 remains turned-off until the rotational speed of the generator reaches a higher level compared with that of the embodiment shown in FIG. 1.

According to the experimental results, the generator can start to generate the output voltage at 4,000 to 5,000 rpm with the diode in place of the resistor 7, and the generator according to the present invention begins to generate the output voltage at a generator speed of 2,000 to 3,000 rpm.

According to the above embodiment, the voltage regulator 5 is assembled within the generator housing, so that conducting wires will not be required therebetween when mounted in an engine room. Thus, troubles, such as a disconnection between the voltage regulator and the generator, may be reduced.

Figure 2:
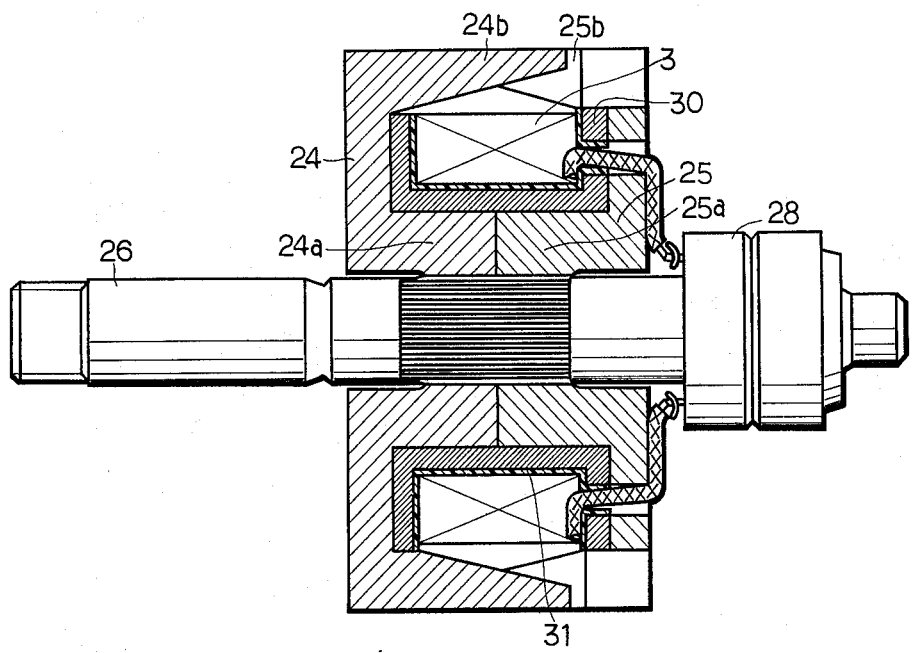
FIGS. 2 to 4 are respectively sectional views showing pole cores of a rotor according to the present invention.

FIG. 2 shows a rotor for a generator in cross-section.

Numerals 24 and 25 designate a pair of pole cores being magnetized oppositely with respect to one another when the field winding 3 enclosed therein is energized. The pole cores 24 and 25 are made of a low-carbon steel through cold-forging and are respectively provided with a plurality of fingers 24b and 25b at outer peripheries and center bosses 24a and 25a, whereby each of the pole cores forming a U-configuration in cross-section. The fingers 24b and 25b project alternately towards the respective opposite pole cores 24 and 25 at their outer peripheries.

A rotary shift 26 is inserted into central bores of the pole cores 24 and 25 and placed at a serrated portion to rotate the cores together.

The field winding 3 is wound on a coil bobbin 30, which is interposed between the pole cores 24 and 25, and is connected to a slip-ring 28 on the shaft 26. The inner surface of the coil bobbin 30 is coated with an insulating layer 31 for the purpose of insulation between the bobbin 30 and the field winding 3.

The coil bobbin 30 is made of a low-carbon steel by a press-forming and being subjected to a cementation treatment.

Accordingly, the pole cores 24 and 25 with the bobbin 30 can provide a sufficient residual magnetism for the voltage generation of the generator.

The coil bobbin may be subjected to a quenching treatment as occassion demands after the cementation treatment.

Thee coil bobbin may be also subjected to the cementation treatment only at the outer surface thereof, while the inner surface may be formed with copper-plating for preventing the inner surface from cementation. The copper-plating is also advantageous in that it facilitates adhesive strength of the insulating layer of epoxy resin etc. thereon.

Figure 3:
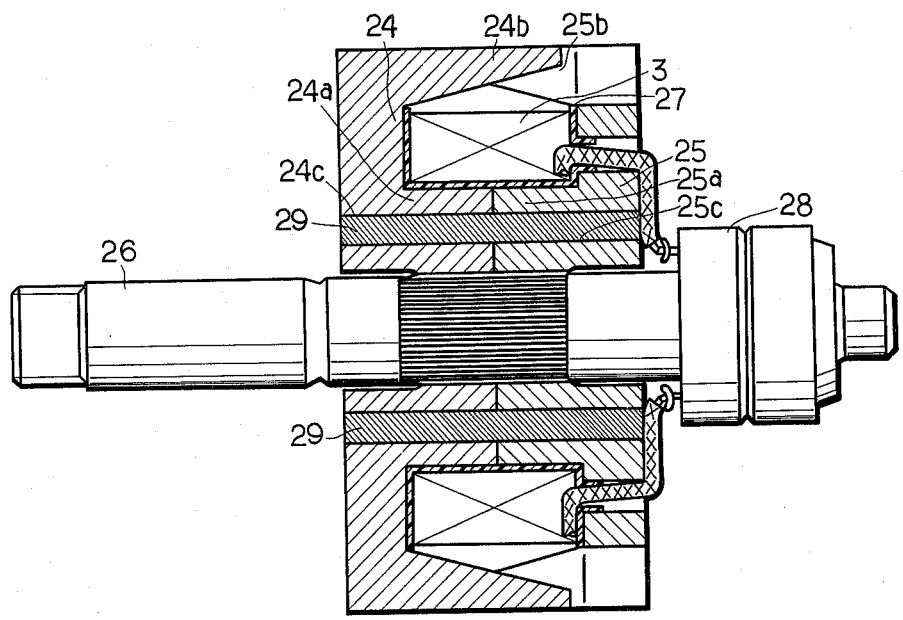

FIG. 3 shows a modified rotation in cross-section, wherein the same reference numerals designate the same or equivalent parts in the embodiment shown in FIG. 2.

The field winding 3 is wound on a bobbin 27 made of an insulating material and interposed between the pole cores 24 and 25.

The cores 24 and 25 are provided with a plurality of holes 24c and 25c through which a plurality of rods 29 made of a high-carbon steel are inserted, and the thus-formed pole cores provide a sufficient residual magnetism for use during starting of the engine, as described above.

The cross-sections of the hole and rod are not limited to a circular configuration, but they may be an arcuate configuration.

Additionally, the hole may be formed with a closed extremity.

Figure 4:
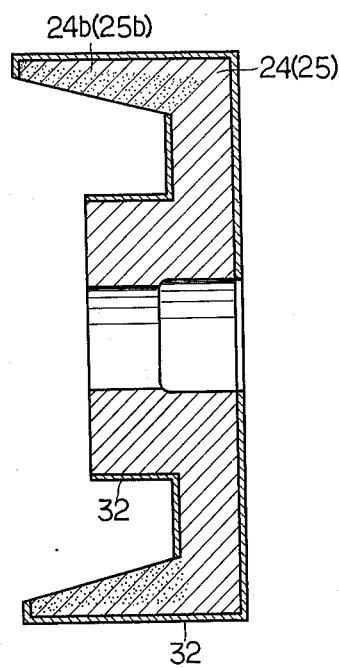

FIG. 4 shows a modified pole core in cross-section.

The pole core 24 shown in FIG. 4 is produced through the following steps.

The pole core is covered with a copper-plating layer 25 at its surface for avoiding cementation. The copper-plating layer 25 at the inner surface of the fingers 24b is cut away, and the portion of the inner surface is subjected to a cementation treatment.

The cementation treatment may be, of course carried out on all the surfaces of the pole core, and also the pole core may be subjected to a quenching treatment after the cementation treatment.

What is claimed is:

1. A current generating system comprising:
   a battery;
   a generator having a generator housing with a single output terminal connected to said battery, said generator having in said generator housing an output winding and a field winding;
   a rectifying device encased in said generator housing and having first positive and negative direct current output terminals and AC input terminals connected to said output winding for rectifying the output from said output winding into direct current, said positive direct current output terminal of said rectifying device being connected with said single output terminal of said generator housing, said rectifying device also having a resistor and a diode to form a second positive terminal, said resistor being connected between said second positive terminal and one of said AC input terminals, and said diode being connected between said second positive terminal at its cathode and the other of said AC input terminals at its anode for providing positive voltage potential at said second positive terminal;
   a voltage regulator also encased in said generator housing and having a voltage responsive circuit responsive to the output voltage of said generator, a first switching transistor having a base connected to said voltage responsive circuit, and a second switching transistor having a base connected to the collector of said first switching transistor, the collector-emitter path of said second switching transistor being connected across said positive and negative direct current output terminals through said field winding; and
   a conductor connecting said second positive terminal with both the collector of said first switching transistor and the base of said second switching transistor, said base of said second switching transistor being electrically isolated from said first positive direct current output terminal, whereby the base current for said second switching transistor is supplied from only said second positive terminal.

2. A current generating system comprising:
   a generator having an output winding and a field winding, said generator further including a rotary shaft, a pair of pole cores carried by said rotary shaft, and a coil bobbin interposed between said pair of pole cores and enclosing said field winding therein, said coil bobbin being made of a low-carbon steel and being subjected to a cementation treatment;
   a rectifier device having input terminals connected to said output winding and a positive and negative terminal;
   voltage supplying means having a resistor and a diode respectively connected to said input terminals;
   a voltage regulator having a switching transistor and a voltage responsive circuit connected to said voltage supplying means;
   conductor means connecting said switching transistor and said field winding in series across said positive and negative terminal of said generator;
   a battery; and
   conductor means for connecting said battery with said positive terminal.

3. A current generating system according to claim 2, wherein said generator further comprises:
   an insulating layer disposed between said coil bobbin and said field winding.

4. A current generating system comprising:
   a generator having an output winding and a field winding, said generator further including a rotary shaft, and a pair of pole cores carried by said rotary shaft between which cores said field winding is interposed, said pole cores being formed of a low-carbon steel and including an aperture within which a high-carbon steel element is inserted;
   a rectifier device having input terminals connected to said output winding and a positive and a negative terminal;
   voltage supplying means having a resistor and a diode respectively connected to said input terminals;
   a voltage regulator having a switching transistor and a voltage responsive circuit connected to said voltage supplying means;
   conductor means connecting said switching transistor and said field winding in series across said positive and negative terminal of said generator;
   a battery; and
   conductor means for connecting said battery with said positive terminal.

5. A current generating system comprising:
   a generator having an output winding and a field winding, said generator further including a pair of pole cores between which said field winding is interposed, said pole cores being made of a low-carbon steel and being subjected to a cementation treatment;
   a rectifier device having input terminals connected to said output winding and a positive and a negative terminal;
   voltage supplying means having a resistor and a diode respectively connected to said input terminals;
   a voltage regulator having a switching transistor and a voltage responsive circuit connected to said voltage supplying means;
   conductor means connecting said switching transistor and said field winding in series across said positive and negative terminal of said generator;
   a battery; and
   conductor means connecting said switching transistor and said field winding in series across said positive and negative terminal of said generator;
   a battery; and
   conductor means for connecting said battery with said positive terminal.

* * * * *